(12) United States Patent
DesRoches et al.

(10) Patent No.: US 8,799,571 B1
(45) Date of Patent: *Aug. 5, 2014

(54) SYSTEM AND METHOD FOR CONFIGURING A DEVICE ARRAY UPON DETECTING ADDITION OF A STORAGE DEVICE

(75) Inventors: David W. DesRoches, Methuen, MA (US); Kiran Madnani, Framingham, MA (US)

(73) Assignee: EMC Corporation, Hopkinton, MA (US)

(*) Notice: Subject to any disclaimer, the term of this patent is extended or adjusted under 35 U.S.C. 154(b) by 838 days.

This patent is subject to a terminal disclaimer.

(21) Appl. No.: 12/239,178

(22) Filed: Sep. 26, 2008

(51) Int. Cl.
G06F 12/00 (2006.01)
G06F 3/00 (2006.01)

(52) U.S. Cl.
USPC .............................. 711/114; 711/118; 711/170

(58) Field of Classification Search
USPC .................................................. 711/114, 118
See application file for complete search history.

(56) References Cited

U.S. PATENT DOCUMENTS

| | | | | |
|---|---|---|---|---|
| 5,615,352 A | * | 3/1997 | Jacobson et al. | 711/114 |
| 5,680,579 A | * | 10/1997 | Young et al. | 711/157 |
| 6,000,010 A | * | 12/1999 | Legg | 711/114 |
| 6,035,373 A | * | 3/2000 | Iwata | 711/114 |
| 6,442,649 B1 | * | 8/2002 | Anderson | 711/114 |
| 6,865,650 B1 | * | 3/2005 | Morley et al. | 711/138 |
| 6,981,070 B1 | * | 12/2005 | Luk et al. | 710/5 |
| 7,194,580 B2 | * | 3/2007 | Shiraishi et al. | 711/114 |
| 2005/0102551 A1 | * | 5/2005 | Watanabe | 714/5 |
| 2005/0235128 A1 | * | 10/2005 | Rustagi et al. | 711/170 |
| 2008/0109601 A1 | * | 5/2008 | Klemm et al. | 711/114 |
| 2009/0172335 A1 | * | 7/2009 | Kulkarni et al. | 711/170 |

* cited by examiner

*Primary Examiner* — Sanjiv Shah
*Assistant Examiner* — Glenn Gossage
(74) *Attorney, Agent, or Firm* — Brian J. Colandreo; Mark H. Whittenberger; Holland & Knight LLP

(57) ABSTRACT

A system, method and computer program product for detecting an additional storage device within an "n" device array. The "n" device array is configured to store "n" device array formatted data. The "n" device array is reconfigured into an "n+m" device array. The "n" device array formatted data is written to the "n+m" device array in an "n+m" device array format. Reconfiguring the "n" device array may include converting the "n" device array formatted data into "n+m" device array formatted data. The "n+m" device array may comprise two storage devices including a mirrored storage device, or may include at least three storage devices including a coded target storage device such as a parity storage device. The coded target storage device may be a distributed coded target as in a RAID array.

12 Claims, 6 Drawing Sheets

FIG. 5

Top table (160):

| | | 252 | 254 | 256 | | 258 | 260 | 262 | | |
|---|---|---|---|---|---|---|---|---|---|---|
| 160 | T6 | P1' | E3-2 | E4-3 | E5-4 | E7-1 | E8-2 | P7' | E10-4 | |
| 158 | T5 | E2-1 | P2' | E4-2 | E5-3 | E6-4 | E8-1 | E9-3 | P8' | |
| 156 | T4 | E1-4 | E3-1 | P3' | E5-2 | E6-3 | E7-4 | E9-2 | E10-3 | |
| 154 | T3 | E1-3 | E2-4 | E4-1 | P4' | E6-2 | E7-3 | E9-1 | E10-2 | |
| 152 | T2 | E1-2 | E2-3 | E3-4 | E5-1 | P5' | E7-2 | E8-4 | E10-1 | |
| 150 | T1 | E1-1 | E2-2 | E3-3 | E4-4 | E6-1 | P6' | E8-3 | E9-4 | |
| | | | | | 264 | 266 | | | | |

Bottom table (128, 250):

| | | | | | | | | | | | |
|---|---|---|---|---|---|---|---|---|---|---|---|
| 158 | T5 | P1 | E2-4 | E3-4 | E4-4 | E5-4 | P6 | E7-4 | E8-4 | E9-4 | E10-4 |
| 156 | T4 | E1-4 | P2 | E3-3 | E4-3 | E5-3 | E6-4 | P7 | E8-3 | E9-3 | E10-3 |
| 154 | T3 | E1-3 | E2-3 | P3 | E4-2 | E5-2 | E6-3 | E7-3 | P8 | E9-2 | E10-2 |
| 152 | T2 | E1-2 | E2-2 | E3-2 | P4 | E5-1 | E6-2 | E7-2 | E8-2 | P9 | E10-1 |
| 150 | T1 | E1-1 | E2-1 | E3-1 | E4-1 | P5 | E6-1 | E7-1 | E8-1 | E9-1 | P10 |

SYSTEM AND METHOD FOR CONFIGURING A DEVICE ARRAY UPON DETECTING ADDITION OF A STORAGE DEVICE

TECHNICAL FIELD

This disclosure relates to cache memory systems and methods and, more particularly, to auto-expanding cache memory systems and methods.

BACKGROUND

Storing and safeguarding electronic data is of paramount importance in modern business. Accordingly, various systems may be employed to protect such electronic data.

For example, disk arrays may be employed that contain multiple storage devices. Disk arrays may provide some level of redundancy by use of mirrored or redundant components (e.g., disk drives, disk controllers, power supplies and/or fans), each of which may be hot-swappable to avoid downtime.

Disk arrays may fall into a plurality of categories, such as Network Attached Storage (NAS) and Storage Area Networks (SAN). A NAS system may be a stand-alone, network-accessible, hard disk storage system that may provide file-level access to electronic data. A SAN array may be a dedicated storage system that may connect numerous storage resources to one or many servers. A SAN may provide block-level access to electronic data through one or more Small Computer Systems Interface (SCSI) based protocols (e.g., Fiber Channel and iSCSI).

The use of solid-state disk drives in such disk arrays is increasing in popularity. A solid state disk drive is a data storage device that uses solid-state memory to store persistent data. A solid-state disk drive may emulate (and therefore replace) a conventional hard disk drive. With no moving parts, a solid-state disk drive largely eliminates (or greatly reduces) seek time, latency and other electromechanical delays and failures associated with a conventional hard disk drive.

Unfortunately and as is true with all storage devices, the disk arrays may fill up with data and performance may fall off. Accordingly, additional disk drives may need to be added to enhance the storage capacity of the disk array.

SUMMARY OF DISCLOSURE

In a first implementation, a method of configuring a device array includes detecting an additional storage device within an "n" device array. The "n" device array is configured to store "n" device array formatted data. The "n" device array is reconfigured into an "n+m" device array. The "n" device array formatted data is written to the "n+m" device array in an "n+m" device array format.

One or more of the following features may be included. Reconfiguring the "n" device array as an "n+m" device array may include converting the "n" device array formatted data into the "n+m" device array format.

The "n" device array formatted data may include a plurality of data segments having "x" data elements. Converting the "n" device array formatted data into the "n+m" device array format may include forming data segments having "x+m" data elements from the data segments having "x" data elements, thus defining the "n+m" device array format.

A preferred high-availability format for the "n+m" device array may be determined. The "n+m" device array may include at least three storage devices and the "n+m" device array may include a coded target storage device. The coded target storage device may be a distributed coded target. The "n+m" device array may include two storage devices and the "n+m" device array may include a mirrored storage device.

In another implementation, a computer program product resides on a computer readable medium that has a plurality of instructions stored on it. When executed by a processor, the instructions cause the processor to perform operations including detecting an additional storage device within an "n" device array. The "n" device array is configured to store "n" device array formatted data. The "n" device array is reconfigured into an "n+m" device array. The "n" device array formatted data is written to the "n+m" device array in an "n+m" device array format.

One or more of the following features may be included. Reconfiguring the "n" device array as an "n+m" device array may include converting the "n" device array formatted data into the "n+m" device array format.

The "n" device array formatted data may include a plurality of data segments having "x" data elements. Converting the "n" device array formatted data into the "n+m" device array format may include forming data segments having "x+m" data elements from the data segments having "x" data elements, thus defining the "n+m" device array format.

A preferred high-availability format for the "n+m" device array may be determined. The "n+m" device array may include at least three storage devices and the "n+m" device array may include a coded target storage device. The coded target storage device may be a distributed coded target. The "n+m" device array may include two storage devices and the "n+m" device array may include a mirrored storage device.

In another implementation, a data storage system includes a volatile, solid-state, cache memory system; a non-volatile, electromechanical memory system; and a non-volatile, solid-state, cache memory system configured as an "n" device array. The data storage system is configured to perform operations including detecting an additional storage device within an "n" device array. The "n" device array is configured to store "n" device array formatted data. The "n" device array is reconfigured into an "n+m" device array. The "n" device array formatted data is written to the "n+m" device array in an "n+m" device array format.

One or more of the following features may be included. Reconfiguring the "n" device array as an "n+m" device array may include converting the "n" device array formatted data into the "n+m" device array format.

The "n" device array formatted data may include a plurality of data segments having "x" data elements. Converting the "n" device array formatted data into the "n+m" device array format may include forming data segments having "x+m" data elements from the data segments having "x" data elements, thus defining the "n+m" device array format.

A preferred high-availability format for the "n+m" device array may be determined. The "n+m" device array may include at least three storage devices and the "n+m" device array may include a coded target storage device. The coded target storage device may be a distributed coded target. The "n+m" device array may include two storage devices and the "n+m" device array may include a mirrored storage device.

The details of one or more implementations are set forth in the accompanying drawings and the description below. Other features and advantages will become apparent from the description, the drawings, and the claims.

BRIEF DESCRIPTION OF THE DRAWINGS

FIG. 5 is another diagrammatic view of the non-volatile, solid-state, cache memory system included within the storage network of FIG. 1.

DETAILED DESCRIPTION OF THE PREFERRED EMBODIMENTS

Figure 1:
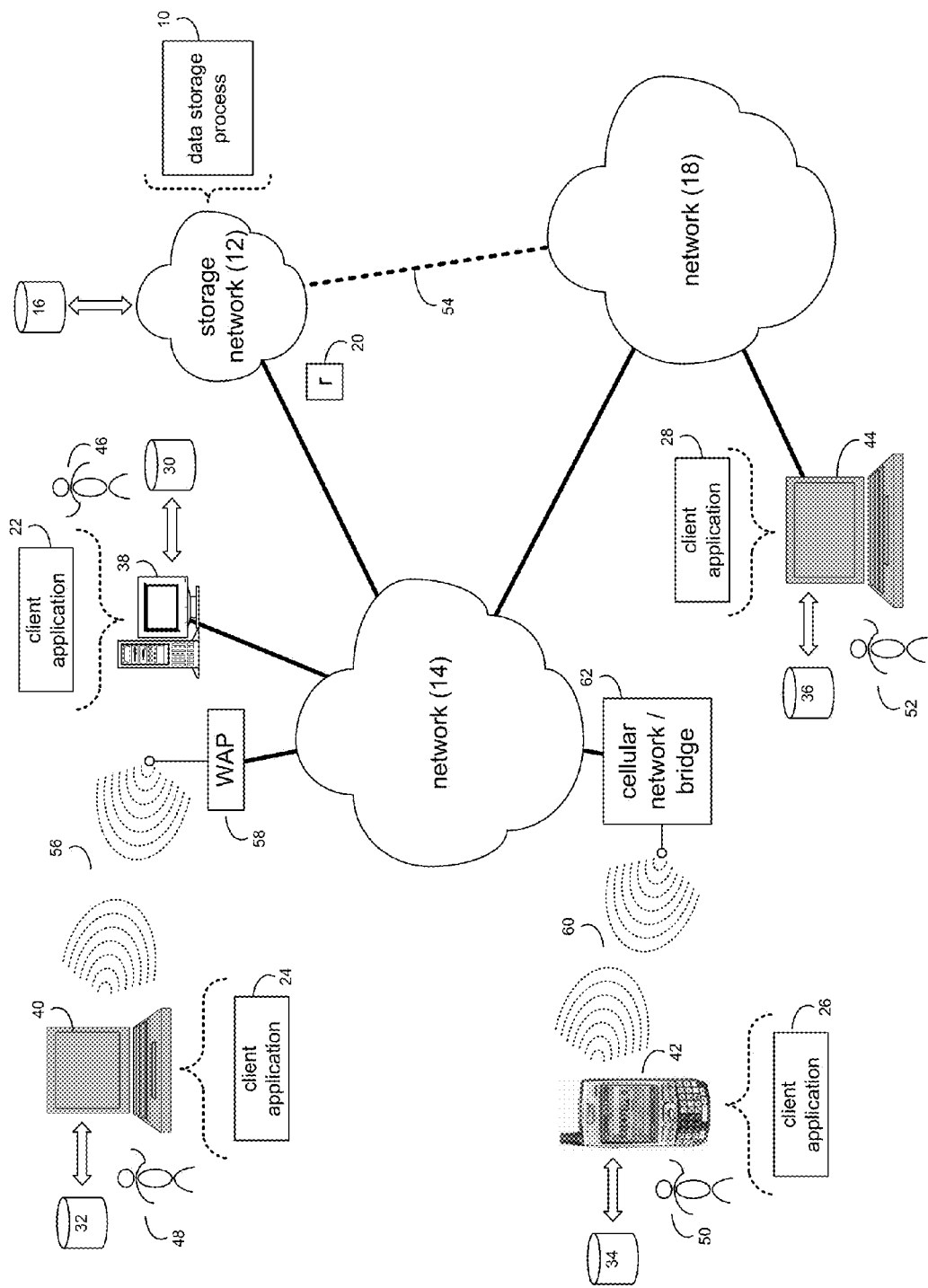
FIG. 1 is a diagrammatic view of a storage network and a data storage process coupled to a distributed computing network.

System Overview:

Referring to FIG. 1, there is shown data storage process 10 that may reside on and may be executed by storage network 12, which may be connected to network 14 (e.g., the Internet or a local area network). Examples of storage network 12 may include, but are not limited to: a Network Attached Storage (NAS) system and a Storage Area Network (SAN). As will be discussed below in greater detail, a SAN may include one or more of a personal computer, a server computer, a series of server computers, a mini computer, a mainframe computer, a Redundant Array of Inexpensive Disks (RAID) device and a NAS system. The various components of storage network 12 may execute one or more operating systems, examples of which may include but are not limited to: MICROSOFT WINDOWS XP SERVER™, NOVELL NETWARE™, REDHAT LINUX™, UNIX, or a custom operating system, for example.

As will be discussed below in greater detail, data storage process 10 may detect an additional storage device within an "n" device array. The "n" device array may be configured to store "n" device array formatted data. The "n" device array may be reconfigured into an "n+m" device array. The "n" device array formatted data may be written to the "n+m" device array in an "n+m" device array format.

The instruction sets and subroutines of data storage process 10, which may be stored on storage device 16 included within storage network 12, may be executed by one or more processors (not shown) and one or more memory architectures (not shown) included within storage network 12. Storage device 16 may include but is not limited to: a hard disk drive; a tape drive; an optical drive; a RAID device; a random access memory (RAM); and a read-only memory (ROM).

Network 14 may be connected to one or more secondary networks (e.g., network 18), examples of which may include but are not limited to: a local area network; a wide area network; or an intranet, for example.

Various data requests (e.g. data request 20) may be sent from client applications 22, 24, 26, 28 to storage network 12. Examples of data request 20 may include but are not limited to data write requests (i.e. a request that a data extent be written to storage network 12) and data read requests (i.e. a request that a data extent be read from storage network 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown).

Users 46, 48, 50, 52 may access storage network 12 directly through network 14 or through secondary network 18. Further, storage network 12 may be connected to network 14 through secondary network 18, as illustrated with link line 54 (shown in phantom using a dashed line).

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an Institute of Electrical and Electronics Engineers (IEEE) 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, BLUETOOTH is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to MICROSOFT WINDOWS™, MICROSOFT WINDOWS CE™, REDHAT LINUX™, or a custom operating system.

The Data Storage Process:

For the following discussion, client application 22 is going to be described for illustrative purposes. However, this is not intended to be a limitation of this disclosure, as other client applications (e.g., client applications 24, 26, 28) may be equally utilized.

Figure 2:
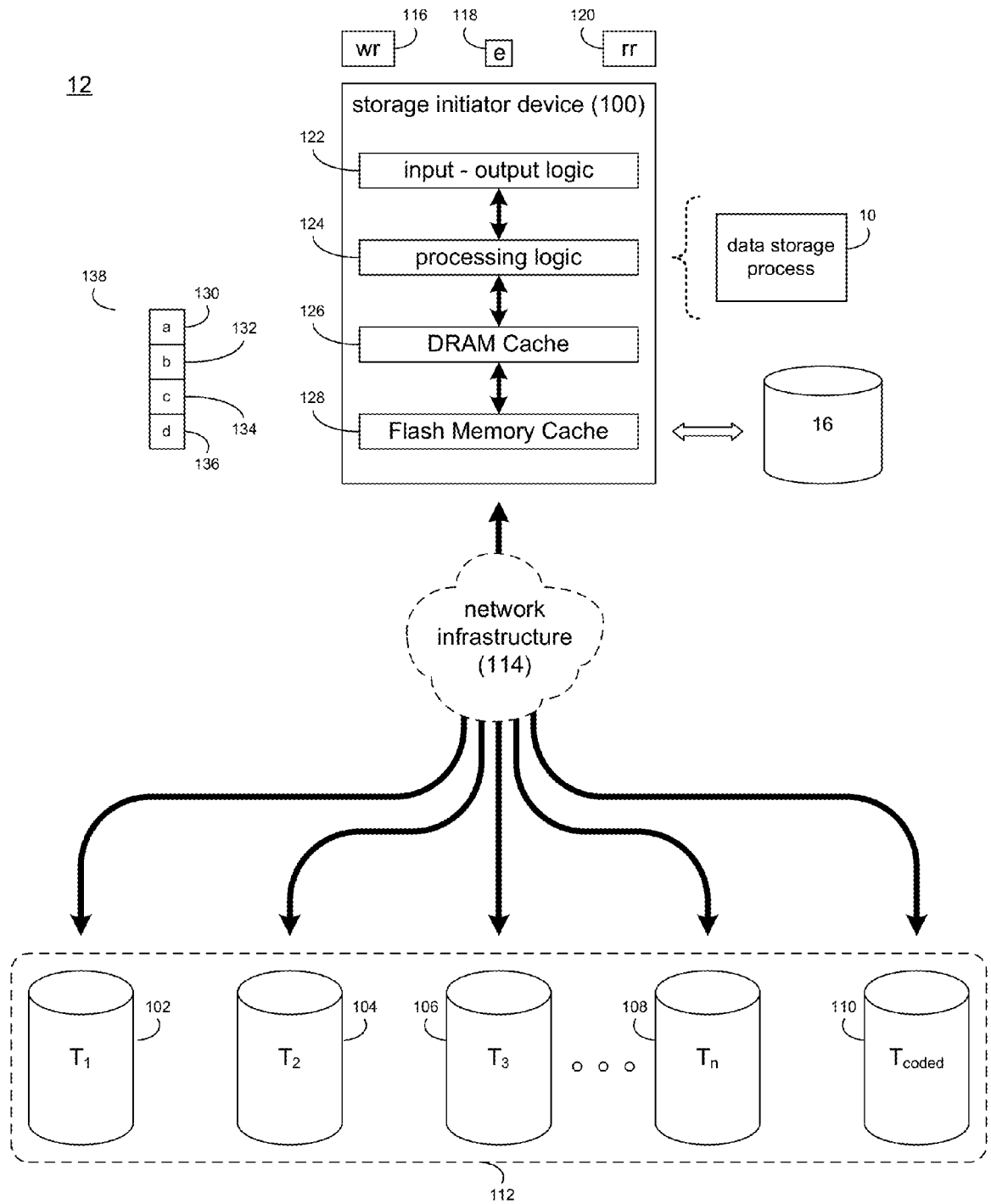
FIG. 2 is a diagrammatic view of the storage network of FIG. 1.

Referring also to FIG. 2, storage network 12 may include a storage initiator device (e.g. storage initiator device 100), and a plurality of storage targets $T_{1-n}$ (e.g. storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Additionally/alternatively, one or more of storage targets 102, 104, 106, 108 may be configured as a RAID 1 array, in which data is mirrored between storage targets. By mirroring data between storage targets, a level of high availability may be achieved as multiple copies of the data are stored within storage network 12.

While storage targets 102, 104, 106, 108 are discussed above as being configured in a RAID 0 or RAID 1 array, this is for illustrative purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage network 12 is shown to include four storage targets (e.g. storage targets 102, 104, 106, 108), this is for illustrative purposes only and is not intended to be a limitation of this disclosure. Specifically, the actual number of storage targets may be increased or decreased depending upon e.g. the level of redundancy/performance/capacity required.

Storage network 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage network 12 is shown to include one coded target (e.g., coded target 110), this is for illustrative purposes only and is not intended to be a limitation of this disclosure. Specifically, the actual number of coded targets may be increased or decreased depending upon e.g. the level of redundancy/performance/capacity required.

A combination of storage targets 102, 104, 106, 108 and coded target 110 may form non-volatile, electromechanical memory system 112.

The manner in which storage network 12 is implemented may vary depending upon e.g. the level of redundancy/performance/capacity required. For example, storage network 12 may be a RAID device in which storage initiator device 100 is a RAID controller card and storage targets 102, 104, 106, 108 and/or coded target 110 are individual "hot-swappable" hard disk drives. An example of such a RAID device may include but is not limited to an NAS device. Alternatively, storage network 12 may be configured as a SAN, in which storage initiator device 100 may be e.g., a server computer and each of storage targets 102, 104, 106, 108 and/or coded target 110 may be a RAID device and/or computer-based hard disk drive. Further still, one or more of storage targets 102, 104, 106, 108 and/or coded target 110 may be a SAN.

In the event that storage network 12 is configured as a SAN, the various components of storage network 12 (e.g. storage initiator device 100, storage targets 102, 104, 106, 108, and coded target 110) may be coupled using network infrastructure 114, examples of which may include but are not limited to an Ethernet (e.g., Layer 2 or Layer 3) network, a fiber channel network, an INFINIBAND network, or any other circuit switched/packet switched network.

Storage initiator device 100 may execute all or a portion of data storage process 10. Additionally, one or more of storage targets 102, 104, 106, 108 and/or coded target 110 may execute all or a portion of data storage process 10. For example, data storage process 10 may be a multi-component process that includes e.g., an initiator-based component (not shown) and a target-based component (not shown). For example and for illustrative purposes, the initiator-based component of data storage process 10 may be executed on storage initiator device 100. Further and for illustrative purposes, the target-based component of data storage process 10 may be executed on each of storage targets 102, 104, 106, 108 and/or coded target 110. Accordingly, the initiator-based component of data storage process 10 and the target-based component(s) of data storage process 10 may cooperatively operate to effectuate all of the functionality of data storage process 10.

The instruction sets and subroutines of the initiator-based component of data storage process 10, which may be stored on a storage device (e.g., storage device 16) coupled to storage initiator device 100, may be executed by one or more processors (not shown) and one or more memory architectures (not shown) included within storage initiator device 100. Storage device 16 may include but is not limited to: a hard disk drive; a tape drive; an optical drive; a RAID device; a random access memory (RAM); and a read-only memory (ROM).

The instruction sets and subroutines of the target-based component(s) of data storage process 10, which may be stored on a storage device (not shown) coupled to e.g., each of storage targets 102, 104, 106, 108 and/or coded target 110 may be executed by one or more processors (not shown) and one or more memory architectures (not shown) included within each of storage targets 102, 104, 106, 108 and/or coded target 110. The storage device (not shown) may include but is not limited to: a hard disk drive; a tape drive; an optical drive; a RAID device; a random access memory (RAM); and a read-only memory (ROM).

As discussed above, various data requests (e.g. data request 20 in FIG. 1) may be sent from client applications 22, 24, 26, 28 to storage network 12, and examples of data request 20 may include but are not limited to data write request 116 (i.e. a request that data extent 118 be written to storage network 12) and data read request 120 (i.e. a request that data extent 118 be read from storage network 12).

As will be discussed below in greater detail, storage initiator device 100 may include input-output logic 122 (e.g., a network interface card), processing logic 124, volatile, solid-state, cache memory system 126 (e.g., a dynamic RAM (DRAM) cache memory system), and non-volatile, solid-state, cache memory system 128 (e.g., a flash-based, cache memory system).

During operation of storage initiator device 100, data (e.g. data extent 118) to be written to storage network 12 may be received by input-output logic 122 (e.g. from network 14 and/or network 18) and processed by processing logic 124. As will be discussed below in greater detail, processing logic 124 may initially store data extent 118 within volatile, solid-state, cache memory system 126, and may subsequently destage data extent 118 to non-volatile, solid-state, cache memory system 128 by gathering a plurality of data extents (e.g., data extent 118) within volatile, solid-state, cache memory system 126, apportioning the data extents into a plurality of data elements (e.g., data elements 130, 132, 134, 136), and destaging this plurality of data elements (e.g., data elements 130, 132, 134, 136) as a single data segment (e.g., data segment 138) to non-volatile, solid-state, cache memory system 128. Processing logic 124 may then destage data segment 138 to the storage targets (e.g. storage targets 102, 104, 106, 108) included within non-volatile, electromechanical memory system 112. Additionally, processing logic 124 may calculate and store coded data on coded target 110 (included within non-volatile, electromechanical memory system 112) that may allow for the regeneration of data lost/corrupted on one or more of storage targets 102, 104, 106, 108.

While not as fast as volatile, solid-state, cache memory system 126, non-volatile, solid-state, cache memory system 128 may be considerably quicker than non-volatile, electromechanical memory system 112. Accordingly, non-volatile, solid-state, cache memory system 128 may be sized so that the number of times that non-volatile, electromechanical memory system 112 is accessed may be reduced. Accordingly, by sizing non-volatile, solid-state, cache memory system 128 so that non-volatile, solid-state, cache memory system 128 retains a quantity of data sufficient to satisfy a significant quantity of data requests (e.g., data request 20), the overall performance of storage network 12 may be enhanced.

Figure 3:
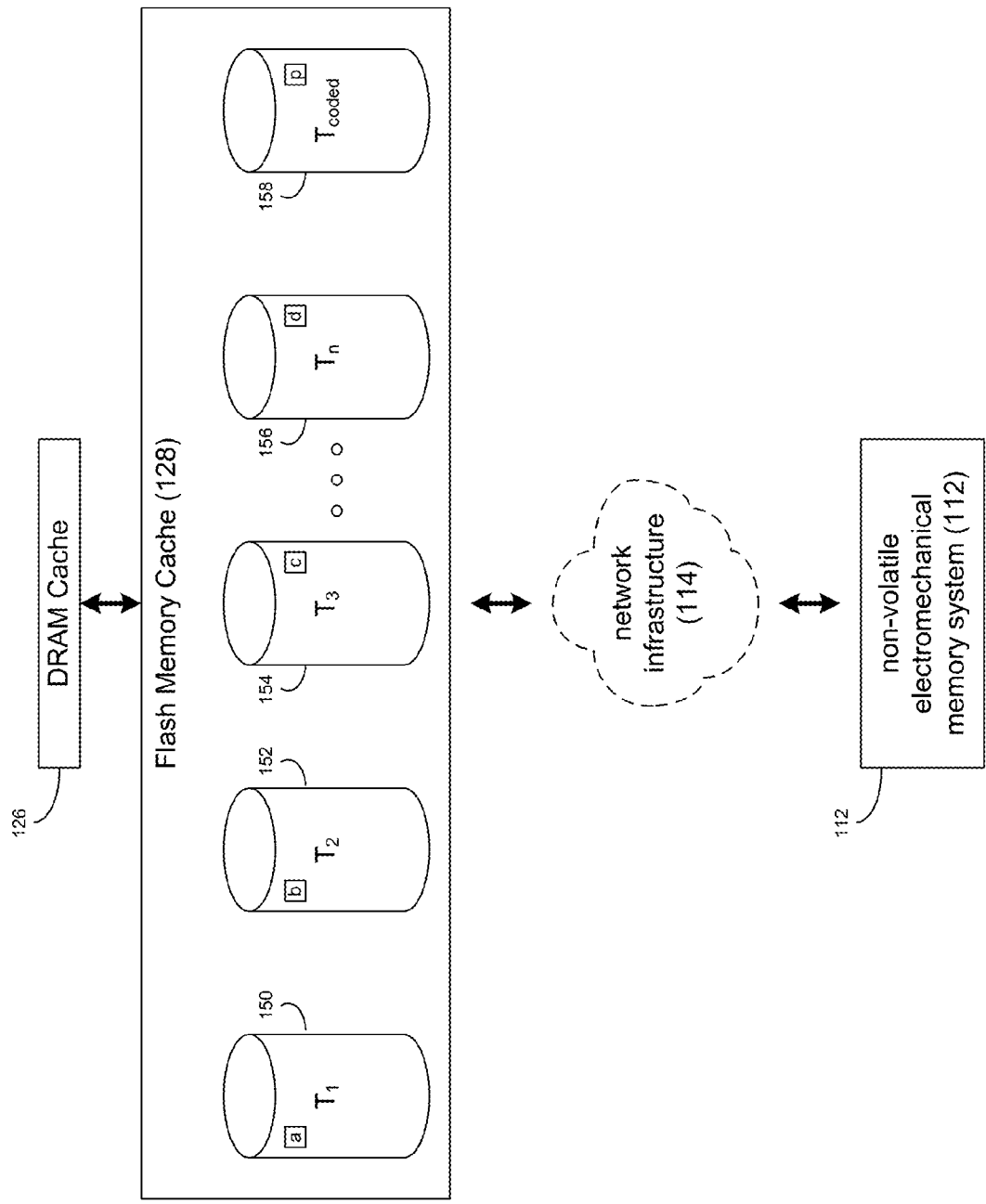
FIG. 3 is a diagrammatic view of a non-volatile, solid-state, cache memory system included within the storage network of FIG. 1.

Referring also to FIG. 3, non-volatile, solid-state, cache memory system (e.g. flash memory cache) 128 may include a plurality of flash solid-state storage devices (e.g. flash solid-state storage devices 150, 152, 154, 156, 158). The plurality of flash solid-state storage devices (e.g. flash solid-state storage devices 150, 152, 154, 156, 158) included within non-volatile, solid-state, cache memory system 128 may be configured as a RAID device that defines coded data.

Accordingly, one or more of the flash solid-state storage devices (e.g. flash solid-state storage devices 150, 152, 154, 156) may be configured as storage targets for storing various data portions received from volatile, solid-state, cache memory system 126 and/or non-volatile, electromechanical memory system 112. Further, one or more of the flash solid-state storage devices (e.g. flash solid-state storage device 158) may be configured as a coded target configured to store coded data that may allow for the regeneration of data portions lost/corrupted on e.g. flash solid-state storage devices 150, 152, 154, 156.

While data storage process 10 is described above as having a "dedicated" coded target (e.g. flash solid-state storage device 158), this is for illustrative purposes only and is not intended to be a limitation of this disclosure. Specifically, the coded target included within non-volatile, solid-state, cache memory system 128 may be a "distributed" coded target (as in a RAID 5 array), in that the coded element for a first data segment may be stored on a first physical device, the coded element for a second data segment may be stored on a second physical device, and the coded element for a third data segment may be stored on a third physical device. For example, for data segment 138, flash solid-state storage device 158 is described as storing coded element "p" and flash solid-state storage devices 150, 152, 154, 156 are described as storing data element "a", data element "b", data element "c", and data element "d" (respectively). However, for a subsequent data segment (data segment "x"; not shown), flash solid-state storage device 150 may be configured to store coded element "p" (for data segment "x") and flash solid-state storage devices 152, 154, 156, 158 may be configured to store data element "a", data element "b", data element "c", and data element "d" (for data segment "x"). Accordingly, data storage process 10 may vary the specific target assigned the task of storing the coded element depending upon the specific data segment being stored within non-volatile, solid-state, cache memory system 128. Therefore, by configuring non-volatile, solid-state, cache memory system 128 as a RAID 5 array, "write" reductions may be equally distributed across all of the flash solid-state storage devices included within non-volatile, solid-state, cache memory system 128 (as opposed to just flash solid-state storage device 158).

Figure 4:
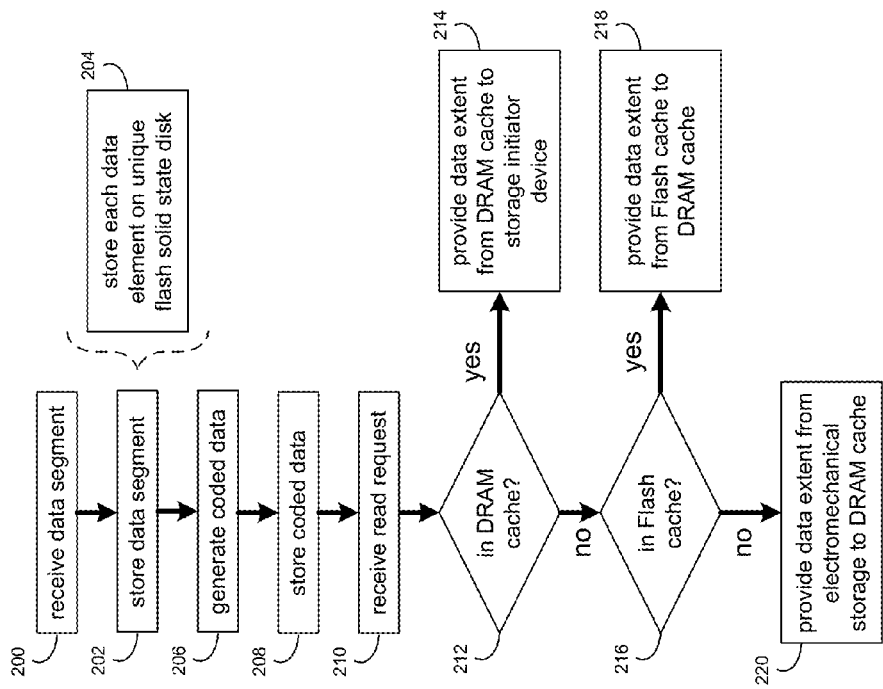
FIG. 4 is an exemplary flowchart of the data storage process of FIG. 1.

Referring also to FIG. 4 and for illustrative purposes, assume that data extent 118 is to be written to non-volatile, solid-state, cache memory system 128. Data extent 118 may be received from volatile, solid-state, cache memory system 126 or from non-volatile, electromechanical memory system 112. For example, data extent 118 may be received from network 14 or network 18 for storage upon storage network 12. Upon being received by input-output logic 122 of FIG. 2, data storage process 10 (which may be executed on processing logic 124) may provide data extent 118 to volatile, solid-state, cache memory system 126. Volatile, solid-state, cache memory system 126 may maintain data extent 118 until data storage process 10 determines that data extent 118 has grown "cold". Data extent 118 may be deemed "cold" when input-output logic 122 has not read data extent 118 from volatile, solid-state, cache memory system 126 for a length of time sufficient to deem the continued storage of data extent 118 within volatile, solid-state, cache memory system 126 unnecessary.

Upon data storage process 10 determining that data extent 118 stored within volatile, solid-state, cache memory system 126 has grown "cold", data storage process 10 may destage data extent 118 to non-volatile, solid-state, cache memory system 128 by gathering a plurality of data extents (e.g., data extent 118) within volatile, solid-state, cache memory system 126, apportioning the data extents into a plurality of data elements (e.g., data elements 130, 132, 134, 136), and destaging this plurality of data elements (e.g., data elements 130, 132, 134, 136) as a single data segment (e.g., data segment 138) to non-volatile, solid-state, cache memory system 128. When destaging data segment 138 to non-volatile, solid-state, cache memory system 128, data storage process 10 may not erase data extent 118 from volatile, solid-state, cache memory system 126 and may merely allow data extent 118 to reside within both volatile, solid-state, cache memory system 126 and non-volatile, solid-state, cache memory system 128 simultaneously.

As is known in the art, when hard disk drives are configured in a RAID5 format, improved reliability may be realized (when compared to non-RAID configurations). However and as is known in the art, performing small random write operations within a RAID5 device is computationally costly and time consuming due to the required pre-read data/parity operations that are needed to compute new parity data for the RAID5 device. Often referred to as a "RAID5 Write Penalty", various companies have developed technology to minimize the impact of the "RAID5 Write Penalty". An example of such technology is disclosed in U.S. Pat. No. 6,865,650 to Morley et al and assigned to EMC Corporation of Hopkinton, Mass.; which is herein incorporated by reference. Such technology may reduce the impact of the "RAID5 Write Penalty" by deploying a "log-based RAID" approach to storing data within a RAID device.

As is known in the art, log-based RAID is the deployment of a Log-structured File System (LFS) onto a conventional RAID architecture, wherein log-style writing allows for the bundling of the data extents (e.g., data extent 118) from multiple small random input/output operations into fewer, larger, data chunks called data elements (e.g., data elements 130, 132, 134, 136) which are destaged as a single data segment (e.g., data segment 138). These data segments may be written to remappable locations on the storage device. By making the size of the data segment align with the stripe size of the RAID5 formatted device, data may be written log-style to the RAID5 device in whole stripes, thus reducing the impact of the above-described "RAID5 Write Penalty".

Data storage process 10 may be configured to utilize such technology. Accordingly, non-volatile, solid-state, cache memory system 128 may be configured as a log-based RAID5 device positioned between volatile, solid-state, cache memory system 126 and non-volatile, electromechanical memory system 112. The above-described log may be stored upon non-volatile, solid-state, cache memory system 128 and written to in whole-stripe-sized segments, and thus volatile, solid-state, cache memory system 126 may not experience the above-described "RAID5 Write Penalty" when volatile, solid-state, cache memory system 126 destages data to non-volatile, solid-state, cache memory system 128 (i.e., when configured as a log-based RAID5 device). Non-volatile, solid-state, cache memory system 128 may then cache data on the premise that a significant ratio of data may be overwritten before needing to be destaged from non-volatile, solid-state, cache memory system 128 to non-volatile, electromechanical memory system 112, thus avoiding costly RAID5 write operations to non-volatile, electromechanical memory system 112.

As a further example, data segment 138 may be provided to non-volatile, solid-state, cache memory system 128 from non-volatile, electromechanical memory system 112 via network infrastructure 114 for storage within non-volatile, solid-state, cache memory system 128.

For illustrative purposes, assume that data segment 138 is an eight-kilobyte data segment that includes four two-kilobyte data elements, namely data element "a", data element "b", data element "c", and data element "d".

Referring again to FIG. 4, upon receiving 200 data segment 138 from e.g., volatile, solid-state, cache memory system 126 or non-volatile, electromechanical memory system 112, data storage process 10 may store 202 data segment 138 on non-volatile, solid-state, cache memory system 128.

As discussed above, one or more of the flash solid-state storage devices (e.g. flash solid-state storage devices 150, 152, 154, 156) included within non-volatile, solid-state, cache memory system 128 may be configured as storage targets for storing various data portions received from volatile, solid-state, cache memory system 126 and/or non-volatile, electromechanical memory system 112.

Continuing with the above-stated example in which data segment 138 includes four two-kilobyte data elements, namely data element "a", data element "b", data element "c", and data element "d", when storing 202 data segment 138 within non-volatile, solid-state, cache memory system 128, each data element of data segment 138 may be stored 204 within a unique flash solid-state storage device or disk chosen from the plurality of flash solid-state storage devices (e.g. flash solid-state storage devices 150, 152, 154, 156). For example, data element "a" may be stored 204 within flash solid-state storage device 150; data element "b" may be stored 204 within flash solid-state storage device 152; data element "c" may be stored 204 within flash solid-state storage device 154; and data element "d" may be stored 204 within flash solid-state storage device 156.

As discussed above, one or more of the flash solid-state storage devices (e.g. flash solid-state storage device 158) may be configured as a coded target configured to store coded data that may allow for the regeneration of data portions lost/corrupted on e.g. flash solid-state storage devices 150, 152, 154, 156. As will be discussed below in greater detail, data storage process 10 may generate 206 coded data (e.g., coded element "p") based upon data element "a", data element "b", data element "c", and data element "d" which were stored 204 upon flash solid-state storage devices 150, 152, 154, 156 respectively. The coded data (e.g., coded element "p") generated 206 may be stored 208 upon flash solid-state storage device 158.

As will be discussed below in greater detail, when storing 208 the coded data (e.g. coded element "p"), the coded data may be stored 208 on coded target 158 only a single time for each time a complete data segment (e.g., data segment 138) is stored 204 on flash solid-state storage devices 150, 152, 154, 156 respectively, thus reducing the number of write operations executed upon non-volatile, solid-state, cache memory system 128.

Concerning the coded data (e.g., coded element "p"), when designing a storage network (e.g. storage network 12) to be highly available for data redundancy, high availability may be achieved by either mirroring data, using coded data, or via a combination of both. Data mirroring is essentially maintaining a real-time (or essentially real-time) redundant copy of the data on a separate hard disk drive (or data storage system). Accordingly, when mirroring data that is "striped" across a plurality of hard disk drives (via the use of e.g. a plurality of data elements), the number of hard disk drives required to construct the storage network is the product of the number of "striped" drives and the desired number of data "mirrors".

By using coded data, the total number of drives required to obtain the desired level of high availability may be reduced. Specifically, a single parity drive may be used to provide high availability for a plurality of storage targets. For example, non-volatile, solid-state, cache memory system 128 is shown to include four flash solid-state storage devices, namely flash solid-state storage device 150, flash solid-state storage device 152, flash solid-state storage device 154, and flash solid-state storage device 156. Accordingly, coded target 158 may be configured as a "parity" drive for storing "parity" data (i.e., a type of coded data) that may provide a level of high availability for flash solid-state storage devices 150, 152, 154, 156.

While non-volatile, solid-state, cache memory system 128 is shown to include a single coded target (e.g. coded target 158), this is for illustrative purposes only and is not intended to be a limitation of this disclosure. For example, the number of coded targets may be increased to provide an enhanced level of high availability. For example, a plurality of coded targets may be utilized with one or more highly-tolerant, error correction algorithms, such as the Reed-Solomon error correction algorithm and the Low-Density, Parity-Check code (i.e. LDPC code) error correction algorithm.

When storing 204 the unique data elements (e.g., data element "a", data element "b", data element "c", or data element "d") and storing 208 the coded data (e.g., coded element "p") of data segment 138 on each of flash solid-state storage devices 150, 152, 154, 156, 158 (respectively), the unique data elements and the unique coded element may be stored in a manner that facilitates easy retrieval (e.g., during read requests for data extents within data segment 138). For example, each data element and coded element may be stored at the same memory address on each of flash solid-state storage devices 150, 152, 154, 156, 158. Specifically, when the four two-kilobyte data elements (e.g., data element "a", data element "b", data element "c", and data element "d") of eight-kilobyte data segment 138 are stored 204 on flash solid-state storage devices 150, 152, 154, 156 and the two-kilobyte coded element (e.g., coded element "p") of eight-kilobyte data segment 138 is generated 206 and stored 208 on flash solid-state storage device 158, each two-kilobyte data element and coded element may be stored at the same memory address within each of flash solid-state storage devices 150, 152, 154, 156, 158.

As discussed above, when storing 208 the coded data (e.g. coded element "p"), the coded data may be stored 208 on coded target 158 only a single time for each time a complete data segment (e.g., data segment 138) is stored 204 on flash solid-state storage devices 150, 152, 154, 156 respectively. Accordingly, upon data segment 138 being received 200 by non-volatile, solid-state, cache memory system 128, data storage process 10 may store 204 data element "a" on flash solid-state storage device 150; may store 204 data element "b" on flash solid-state storage device 152; may store 204 data element "c" on flash solid-state storage device 154; and may store 204 data element "d" on flash solid-state storage device 156. Only once the storage 204 of the four data elements (namely data element "a", data element "b", data element "c", and data element "d") has been completed will coded element "p" be stored 208 on flash solid-state storage device 158 (i.e., the coded target). Additionally/alternatively, coded element "p" may be stored 208 at the same time that data element "a", data element "b", data element "c" and data element "d" are stored 204. As discussed above, by only writing coded element "p" to flash solid-state storage device 158 once (i.e., as opposed to, in this example, four times), the number of write operations executed upon flash solid-state storage device 158 is reduced by the following ratio:

$$\text{ratio} = \left(\frac{\#\ fssd(\text{data}) - 1}{\#\ fssd(\text{data})}\right) = \frac{4-1}{4} = 75\%$$

Upon receiving 210, on storage initiator device 100, a data read request (e.g., data read request 120) for a data extent that had been previously-stored within storage network 12, data storage process 10 may examine volatile, solid-state, cache memory system 126 to determine 212 if the previously-stored data extent is stored within volatile, solid-state, DRAM cache memory system 126.

If the previously-stored data extent is stored within volatile, solid-state, cache memory system 126, data storage process 10 may provide 214 the previously-stored data extent from volatile, solid-state, cache memory system 126 to storage initiator device 100.

If the previously-stored data extent is not stored within volatile, solid-state, cache memory system 126, data storage process 10 may examine non-volatile, solid-state, flash cache memory system 128 to determine 216 if the previously-stored data extent is stored within non-volatile, solid-state, cache memory system 128.

If 216 the previously-stored data extent is stored within non-volatile, solid-state, flash cache memory system 128, data storage process 10 may provide 218 the previously-stored data extent from non-volatile, solid-state, flash cache memory system 128 to volatile, solid-state, cache memory system 126.

If 216 the previously-stored data extent is not stored within non-volatile, solid-state, flash cache memory system 128, data storage process 10 may provide 220 the previously-stored data extent from non-volatile, electromechanical memory system 112 to volatile, solid-state, cache memory system 126. By providing the previously-stored data extent directly from non-volatile, electromechanical memory system 112 to volatile, solid-state, cache memory system 126 (thus bypassing non-volatile, solid-state, flash cache memory system 128), the number of times that data is written to non-volatile, solid-state, flash cache memory system 128 is reduced.

Figure 6:
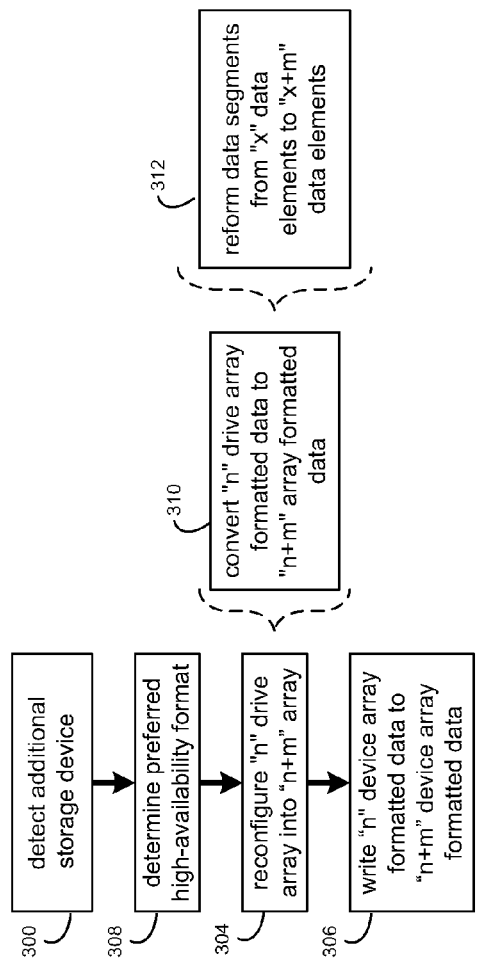
FIG. 6 is another exemplary flowchart of the data storage process of FIG. 1; and Like reference symbols in the various drawings indicate like elements.

The Auto-Expanding Process:

Referring also to FIGS. 5 & 6 and as discussed above, non-volatile, solid-state, cache memory system 128 may include a plurality of flash solid-state storage devices (e.g. flash solid-state storage devices 150, 152, 154, 156, 158). The plurality of flash solid-state storage devices (e.g. flash solid-state storage devices 150, 152, 154, 156, 158) included within non-volatile, solid-state, cache memory system 128 may be configured as a RAID device that defines coded data.

Further and as discussed above, one or more of the flash solid-state storage devices (e.g. flash solid-state storage devices 150, 152, 154, 156) may be configured as storage targets for storing various data portions received from volatile, solid-state, cache memory system 126 and/or non-volatile, electromechanical memory system 112. Further, one or more of the flash solid-state storage devices (e.g. flash solid-state storage device 158) may be configured as a coded target configured to store coded data that may allow for the regeneration of data portions lost/corrupted on e.g. flash solid-state storage devices 150, 152, 154, 156.

For illustrative purposes and as discussed above, assume that the coded target included within non-volatile, solid-state, cache memory system 128 is a "distributed" coded target (as in a RAID 5 array), in that the coded element (e.g., P1) for a first data segment (e.g., data segment 250) may be stored on a first physical device (e.g. flash solid-state storage device 158), the coded element (e.g., P2) for a second data segment (e.g., data segment 252) may be stored on a second physical device (e.g. flash solid-state storage device 156), and the coded element (e.g., P3) for a third data segment (e.g., data segment 254) may be stored on a third physical device (e.g. flash solid-state storage device 154). Accordingly, data storage process 10 may vary the specific target assigned the task of storing the coded element depending upon the specific data segment being stored within non-volatile, solid-state, cache memory system 128.

As discussed above and as will be discussed below in greater detail, data storage process 10 may detect 300 an additional storage device within an "n" device array. The "n" device array may be configured to store "n" device array formatted data. The "n" device array may be reconfigured 304 into an "n+m" device array. The "n" device array formatted data may be written 306 to the "n+m" device array in an "n+m" device array format.

For example, assume for illustrative purposes that flash solid-state storage device 160 is added by an administrator (not shown) of storage network 12, resulting in the availability of additional storage space. Specifically, assuming that storage devices 150, 152, 154, 156, 158, 160 are all the same size, the addition of storage device 160 will result in a 25% increase in the storage capacity of storage network 12 (assuming one coded target).

Further, assume that upon detecting 300 the addition of flash solid-state storage device 160, data storage process 10 may determine 308 a preferred high-availability format for flash solid-state storage devices 150, 152, 154, 156, 158, 160 in non-volatile, solid-state, cache memory system 128. For example, since non-volatile, solid-state, cache memory system 128 initially had five flash solid-state storage devices and that one device (i.e., flash solid-state storage device 160) was added, data storage process 10 may determine 302 the preferred high-availability format for the six flash solid-state storage devices 150, 152, 154, 156, 158, 160.

Data storage process 10 may be configured to prefer a high-availability format that utilizes coded elements if possible. One possible example of such a configuration may have data storage process 10 select a high-availability format that includes a coded drive (e.g., a dedicated coded drive or a distributed coded drive) if there are at least three flash solid-state storage devices, examples of which may include RAID 3, RAID 4, RAID 5 & RAID 6. In the event that only two flash solid-state storage devices are present after the addition of the new storage device (e.g., non-volatile, solid-state, cache memory system 128 initially has only one flash solid-state storage device and a second one is added), data storage process 10 may determine 302 a high-availability format that includes a mirrored drive, an example of which may include RAID 1.

Continuing with the above stated example in which flash solid-state storage device 160 is added, assume for illustrative purposes that data storage process 10 determines 302 the preferred high-availability format for the six flash solid-state storage devices 150, 152, 154, 156, 158, 160 is a RAID 5 format, in which five of the six solid-state storage devices are used to store data and one of the solid-state storage devices is used to store parity (i.e., coded) data. Further, as RAID 5 uses a distributed coded drive, the various pieces of parity data are distributed across the six flash solid-state storage devices 150, 152, 154, 156, 158, 160.

Prior to the addition of flash solid-state storage device 160, non-volatile, solid-state, cache memory system 128 includes five flash solid-state storage devices. Accordingly, the data segments that were stored within non-volatile, solid-state, cache memory system 128 were configured by data storage process 10 to be compatible with the five-drive non-volatile, solid-state, cache memory system 128. Accordingly and prior to the addition of flash solid-state storage device 160, the data segments (e.g., data segment 250) stored within non-volatile, solid-state, cache memory system 128 were configured to include four data segments (i.e., data segments E1-1, E1-2, E1-3, E1-4) and one coded segment (coded segment P1).

However, once data storage process 10 detects 300 the addition of flash solid-state storage device 160, data storage process 10 may reconfigure 304 the five-device array into a six-device array. Accordingly, data storage process 10 may reconfigure 304 non-volatile, solid-state, cache memory system 128 into a six-device array that includes flash solid-state storage devices 150, 152, 154, 156, 158, 160.

When reconfiguring 304 non-volatile, solid-state, cache memory system 128 from a five-device array to a six-device array, data storage process 10 may convert 310, in this particular example, the five-device array formatted data into the six-device array formatted data. Specifically, data storage process 10 may reform 312 the data segments from a five element data segment (i.e., four data elements and one coded element) to a six element data segment (i.e., five data elements and one coded element).

Specifically, data storage process 10 may perform the following operations:
  combine data elements E1-1, E1-2, E1-3, E1-4 & E2-1 with coded element P1' (that is calculated from data elements E1-1, E1-2, E1-3, E1-4 & E2-1) to form data segment 252. Once data segment 252 is formed by data storage process 10, data storage process 10 may write 306 data segment 252 to the appropriate location within non-volatile, solid-state, cache memory system 128, which was reconfigured 304 from a five-device array into a six-device array by data storage process 10.
  combine data elements E2-2, E2-3, E2-4, E3-1 & E3-2 with coded element P2' (that is calculated from data elements E2-2, E2-3, E2-4, E3-1 & E3-2) to form data segment 254. Once data segment 254 is formed by data storage process 10, data storage process 10 may write 306 data segment 254 to the appropriate location within non-volatile, solid-state, cache memory system 128, which was reconfigured 304 from a five-device array into a six-device array by data storage process 10.
  combine data elements E3-3, E3-4, E4-1, E4-2 & E4-3 with coded element P3' (that is calculated from data elements E3-3, E3-4, E4-1, E4-2 & E4-3) to form data segment 256. Once data segment 256 is formed by data storage process 10, data storage process 10 may write 306 data segment 256 to the appropriate location within non-volatile, solid-state, cache memory system 128, which was reconfigured 304 from a five-device array into a six-device array by data storage process 10.
  combine data elements E4-4, E5-1, E5-2, E5-3 & E5-4 with coded element P4' (that is calculated from data elements E4-4, E5-1, E5-2, E5-3 & E5-4) to form data segment 258. Once data segment 258 is formed by data storage process 10, data storage process 10 may write 306 data segment 258 to the appropriate location within non-volatile, solid-state, cache memory system 128, which was reconfigured 304 from a five-device array into a six-device array by data storage process 10.
  combine data elements E6-1, E6-2, E6-3, E6-4 & E7-1 with coded element P5' (that is calculated from data elements E6-1, E6-2, E6-3, E6-4 & E7-1) to form data segment 260. Once data segment 260 is formed by data storage process 10, data storage process 10 may write 306 data segment 260 to the appropriate location within non-volatile, solid-state, cache memory system 128, which was reconfigured 304 from a five-device array into a six-device array by data storage process 10.
  combine data elements E7-2, E7-3, E7-4, E8-1 & E8-2 with coded element P6' (that is calculated from data elements E7-2, E7-3, E7-4, E8-1 & E8-2) to form data segment 262. Once data segment 262 is formed by data storage process 10, data storage process 10 may write 306 data segment 262 to the appropriate location within non-volatile, solid-state, cache memory system 128, which was reconfigured 304 from a five-device array into a six-device array by data storage process 10.
  combine data elements E8-3, E8-4, E9-1, E9-2 & E9-3 with coded element P7' (that is calculated from data elements E8-3, E8-4, E9-1, E9-2 & E9-3) to form data segment 264. Once data segment 264 is formed by data storage process 10, data storage process 10 may write 306 data segment 264 to the appropriate location within non-volatile, solid-state, cache memory system 128, which was reconfigured 304 from a five-device array into a six-device array by data storage process 10.
  combine data elements E9-4, E10-1, E10-2, E10-3 & E10-4 with coded element P8' (that is calculated from data elements E9-4, E10-1, E10-2, E10-3 & E10-4) to form data segment 266. Once data segment 266 is formed by data storage process 10, data storage process 10 may write 306 data segment 266 to the appropriate location within non-volatile, solid-state, cache memory system 128, which was reconfigured 304 from a five-device array into a six-device array by data storage process 10.

Data storage process 10 may repeat the above-described combining of data elements and coded elements to form data segments until all data elements stored on, in this example, non-volatile, solid-state, cache memory system 128 prior to the addition of flash solid-state storage device 160 are formed into a format that is compatible with the non-volatile, solid-state, cache memory system 128. In the event that there are an insufficient number of data elements to form a complete data segment, "filler" (i.e., empty) data elements may be utilized by data storage process 10 to complete the data segment.

While the system is described above as operating on the data element level, other configurations are possible and are considered to be within the scope of this disclosure. For illustrative purposes and continuing with the above-stated example, data may be moved from the original five-element format to the new six-element format at the data extent level.

While various portions of the above-described system are described as being RAID 0, RAID 1, RAID 4 and RAID 5, this is for illustrative purposes only and is not intended to be a limitation of this disclosure. Specifically, the various portions of the above-described system may be configured using one or more standard RAID levels or one or more custom RAID levels.

For example, non-volatile, solid-state, cache memory system 128 may be configured using a variety of RAID levels. As discussed below, non-volatile, solid-state, cache memory system 128 may be configured dynamically (i.e., the data may be written to non-volatile, solid-state, cache memory system 128 using the RAID level that best suits the particular type of data being written).

SYSTEM METADATA may be small input-output (I/O) operations (e.g., data extent 118) that need redundancy, but are not easily gathered into a data segment due to their small size and their function as data descriptors (e.g., system metadata often describes remapped data). Accordingly, data storage process 10 may write system metadata extents to non-volatile, solid-state, cache memory system 128 using a RAID 1 format.

CLEAN USER DATA: Clean user data extents may be gathered into data segments that do not require redundancy in the cache. Accordingly, data storage process 10 may write clean user data extents to non-volatile, solid-state, cache memory system 128 as a data segment using a RAID 0 format.

DIRTY USER DATA: Dirty user data extents may be gathered into data segments, but (unlike clean user data extents) does require redundancy. Accordingly, data storage process 10 may write dirty user data extents to non-volatile, solid-state, cache memory system 128 as a data segment using a log-style, full-stripe RAID 5 write operation (as discussed above and as disclosed in U.S. Pat. No. 6,865,650 to Morley et al and assigned to EMC Corporation of Hopkinton, Mass.).

Map databases may be maintained that describe the location of the various data extents within non-volatile, solid-state, cache memory system 128. Accordingly, when reconfiguring 304 non-volatile, solid-state, cache memory system 128, data storage process 10 may update the above-described maps to reflect the new locations of the various data extents.

A number of implementations have been described. Nevertheless, it will be understood that various modifications may be made. Accordingly, other implementations are within the scope of the following claims.

What is claimed is:

1. A method of configuring a device array comprising:
   detecting an additional storage device within an "n" device array including a flash solid-state storage device, wherein the "n" device array is configured to store "n" device array formatted data including a plurality of data segments having "x" data elements;
   reconfiguring the "n" device array into an "n+m" device array;
   writing the "n" device array formatted data to the "n+m device array in an "n+m" device array format;
   wherein reconfiguring the "n" device array into an "n+m" device array includes converting the "n" device array formatted data into the "n+m" device array format by forming data segments having "x+m" data elements from the data segments having "x" data elements, wherein each of the "x+m" data elements are equal in size to each of the "x" data elements;
   wherein writing the "n" device array formatted data to the "n+m" device array includes writing each data segment having "x+m" data elements to the "n+m" device array after each data segment having "x+m" data elements is formed and a coded element for each data segment is calculated, wherein the coded element for each data segment is calculated and written once, such that a number of write operations executed on the flash solid-state storage device is reduced;
   after writing the "n" device array formatted data to the "n+m" device array in the "n+m" device array format, if an insufficient number of data elements exist to form a complete data segment, utilizing filler data elements to complete the data segment; and
   determining a preferred high-availability format for the "n+m" device array based upon, at least in part, a number of flash solid-state storage devices in the "n+m" device array.

2. The method of claim 1 wherein the "n+m" device array includes at least three storage devices and the "n+m" device array includes a coded target storage device.

3. The method of claim 2 wherein the coded target storage device is a distributed coded target.

4. The method of claim 1 wherein the "n+m" device array includes two storage devices and the "n+m" device array includes a mirrored storage device.

5. A computer program product residing on a non-transitory computer readable medium having a plurality of instructions stored thereon which, when executed by a processor, cause the processor to perform operations comprising:
   detecting an additional storage device within an "n" device array including a flash solid-state storage device, wherein the "n" device array is configured to store "n" device array formatted data including a plurality of data segments having "x" data elements;
   reconfiguring the "n" device array into an "n+m" device array;
   writing the "n" device array formatted data to the "n+m" device array in an "n+m" device array format;
   wherein reconfiguring the "n" device array into an "n+m" device array includes converting the "n" device array formatted data into the "n+m" device array format by forming data segments having "x+m" data elements from the data segments having "x" data elements, wherein each of the "x+m" data elements are equal in size to each of the "x" data elements;
   wherein writing the "n" device array formatted data to the "n+m" device array includes writing each data segment having "x+m" data elements to the "n+m" device array after each data segment having "x+m" data elements is formed and a coded element for each data segment is calculated, wherein the coded element for each data segment is calculated and written once, such that a number of write operations executed on the flash solid-state storage device is reduced;
   after writing the "n" device array formatted data to the "n+m" device array in the "n+m" device array format, if an insufficient number of data elements exist to form a complete data segment, utilizing filler data elements to complete the data segment; and
   determining a preferred high-availability format for the "n+m" device array based upon, at least in part, a number of flash solid-state storage devices in the "n+m" device array.

6. The computer program product of claim 5 wherein the "n+m" device array includes at least three storage devices and the "n+m" device array includes a coded target storage device.

7. The computer program product of claim 6 wherein the coded target storage device is a distributed coded target.

8. The computer program product of claim 5 wherein the "n+m" device array includes two storage devices and the "n+m" device array includes a mirrored storage device.

9. A data storage system comprising:
a volatile, solid-state, cache memory system;
a non-volatile, electromechanical memory system; and
a non-volatile, solid-state, cache memory system configured as an "n" device array including a flash solid-state storage device;
wherein the data storage system is configured to perform operations comprising:
   detecting an additional flash solid-state storage device within the "n" device array, wherein the "n" device array is configured to store "n" device array formatted data including a plurality of data segments having "x" data elements;
   reconfiguring the "n" device array into an "n+m" device array;
   writing the "n" device array formatted data to the "n+m" device array in an "n+m" device array format;
   wherein reconfiguring the "n" device array into an "n+m" device array includes converting the "n" device array formatted data into the "n+m" device array format by forming data segments having "x+m" data elements from the data segments having "x" data elements, wherein each of the "x+m" data elements are equal in size to each of the "x" data elements;
   wherein writing the "n" device array formatted data to the "n+m" device array includes writing each data segment having "x+m" data elements to the "n+m" device array after each data segment having "x+m" data elements is formed and a coded element for each data segment is calculated, wherein the coded element for each data segment is calculated and written once, such that a number of write operations executed on the flash solid-state storage device is reduced;
   after writing the "n" device array formatted data to the "n+m" device array in the "n+m" device array format, if an insufficient number of data elements exist to form a complete data segment, utilizing filler data elements to complete the data segment; and
   determining a preferred high-availability format for the "n+m" device array based upon, at least in part, a number of flash solid-state storage devices in the "n+m" device array.

10. The data storage system of claim 9 wherein the "n+m" device array includes at least three storage devices and the "n+m" device array includes a coded target storage device.

11. The data storage system of claim 10 wherein the coded target storage device is a distributed coded target.

12. The data storage system of claim 9 wherein the "n+m" device array includes two storage devices and the "n+m" device array includes a mirrored storage device.

* * * * *